Patented Sept. 5, 1922.

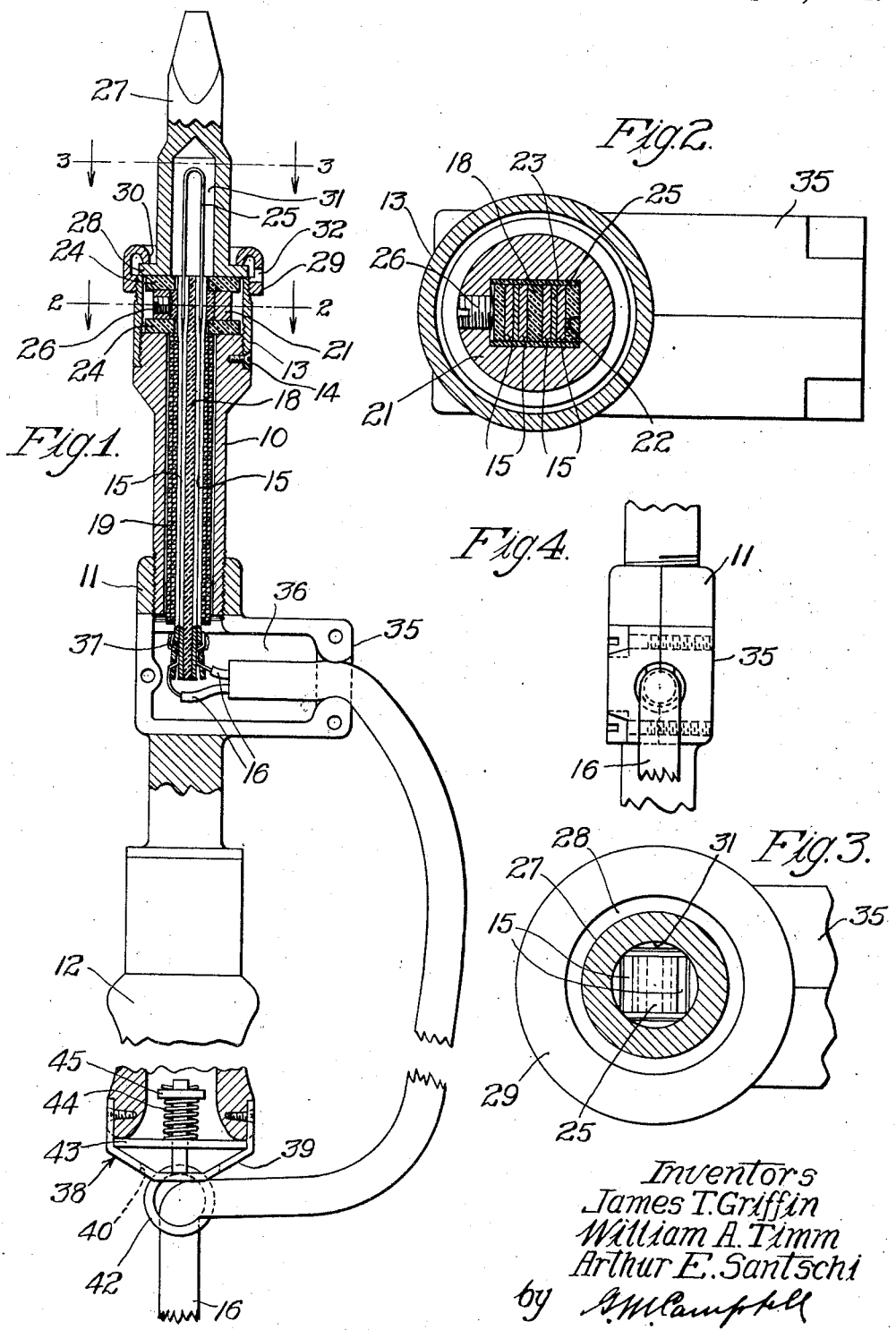

1,428,227

UNITED STATES PATENT OFFICE.

JAMES T. GRIFFIN, OF OAK PARK, ILLINOIS, WILLIAM A. TIMM, OF BERWYN, ILLINOIS, AND ARTHUR E. SANTSCHI, OF CICERO, ILLINOIS, ASSIGNORS TO WESTERN ELECTRIC COMPANY, INCORPORATED, OF NEW YORK, N. Y., A CORPORATION OF NEW YORK.

ELECTRIC SOLDERING IRON.

Application filed October 16, 1920. Serial No. 417,403.

*To all whom it may concern:*

Be it known that we, JAMES T. GRIFFIN, WILLIAM A. TIMM, and ARTHUR E. SANTSCHI, citizens of the United States, residing at Oak Park, Berwyn, and Cicero, respectively, in the county of Cook and State of Illinois, have invented certain new and useful Improvements in Electric Soldering Irons, of which the following is a full, clear, concise, and exact description.

This invention relates to improvements in electric soldering irons of the type in which a self supporting heating element is positioned within the soldering head and has for its object the provision of a compact and convenient structure in which all of the principal parts are readily accessible for repair and replacement.

In the preferred form of this invention the soldering head is provided with a circular flange which is clamped to a supporting stem by a clamping member. The heating element is in the form of a U-shaped tape or ribbon adapted to have the greater portion thereof positioned within the soldering head. The free ends of the heating element are clamped within a supporting member in engagement with the current carrying conductors with the supporting member clamped in position within the supporting stem by the clamping of the soldering head thereon.

In the drawings:

Fig. 1 is an elevation partially in section of a soldering iron embodying the features of this invention;

Fig. 2 is an enlarged cross-section taken on the line 2—2 thereof;

Fig. 3 is an enlarged cross section taken on the line 3—3 of Fig. 1; and

Fig. 4 is a view in elevation of a portion of Fig. 1 viewed from the right-hand side.

As shown in the drawings, 10 is a supporting metal stem which is screw threaded at one end into a conductor inlet box 11 which supports at its opposite end a handle 12. Upon the opposite end of the stem 10 is screw threaded a sleeve 13 which is held from turning thereon by a set screw 14. Current carrying conductors 15—15 in the form of ribbons (see Fig. 2) but which may be of any suitable form are suitably secured within the terminal box 11 to external current carrying conductors 16—16. As shown in the drawings (see Figs. 1 and 2) the conductors 15—15 are each composed of two flat ribbons of copper with an insulation of strip mica 18 placed between each pair of ribbons and the whole is wrapped with several layers of asbestos cord, as indicated at 19, to insulate the conductors from the stem 10. Placed within the sleeve 13 is a metal collar 21 provided with a rectangular shaped opening 22 (see Fig. 2) through which the conductors 15—15 and the mica insulation 18 extend. The opening 22 is lined with strip mica, as indicated at 23, to insulate the conductors from the collar 21. Insulating washers 24 made from asbestos lumber are located above and below the collar 21.

The heating element consists of a U-shaped piece of resistance tape or ribbon 25 with its free ends inserted between the copper ribbons comprising each conductor 15, with the loop portion extending above the end of the sleeve 13 and into the soldering head. The resistance tape or ribbon 25 is sufficiently rigid to be supported by the clamping means alone in its position, thereby avoiding the use of other supporting means for the effective part of the heating element which would tend to dissipate its heat and otherwise decrease its efficiency. A set screw 26 in the collar 21 provides for clamping the ends of the heating element 25 and the conductors 15—15 in place in the opening 22 in the collar 21. A copper soldering head or tip 27 provided with a circular flange 28 is clamped against the upper end of the sleeve 13 by a clamping nut 29 which is screw threaded onto the upper end of the sleeve 13 and provided with a turned-over portion 30 which bears on the flange 28, thereby clamping the flange 28 between the upper end of the sleeve 13 and the nut 29.

To replace the heating element 25, the set screw 14 is unscrewed from the stem 12, after which the sleeve 13 is free to be removed. In removing the sleeve 13 the nut 29 and the tip 27 are removed therewith, thereby exposing the set screw 26 without putting any strain upon the conductors or connections within the iron. After loosening the screw 26 the heating element 25 may be removed from between the ribbons comprising each conductor 15 and replaced with a new one.

The soldering head 27 is provided with a recess 31 into which the greater portion of the heating element 25 extends. An opening 32 in the nut 29 provides for the use of a suitable tool for clamping or unclamping the nut 29.

The conductor inlet box 11 is equipped with a projecting portion 35 provided with a chamber 36 for the entrance of the external current carrying conductors 16—16 which are suitably secured to the conductors 15—15, as indicated at 37.

A conductor holder 38 is secured to the bottom end of the handle 12 and consists of a U-shaped strap 39 provided with a rectangular shaped slot 40 in its lower surface and in line with the center of the handle. A spring operated eye 42 through which the conductors are threaded projects out of the slot 40 and clamps the conductors between the eye and the strap. The eye 42 is secured to a pin which rides in a suitable opening in a cross bar 43 suitably held in position between the strap 39 and the end of the handle 12. A compression spring 44 positioned around the pin and between the cross bar and a retaining disk 45 on the pin functions to draw the eye into the slot, thereby clamping the conductors in position. To release the conductors 16—16 to change the loop formed therein between the box 11 and the eye 42, the eye is pulled from in the slot 40 against the action of the spring 44.

What is claimed is:

1. An electric soldering iron comprising a supporting stem, a recessed tip with means formed thereon for securing it to said stem, an electrical heating element projecting into said tip, supporting means for said heating element positioned at the open end of said tip and adapted to be secured with said heating element against longitudinal movement within the stem when said tip is secured to said stem, and clamping means for securing said tip to said stem.

2. An electric soldering iron comprising a supporting stem, a recessed tip equipped with a flange at one end for securing it to said stem, an electrical heating element projecting into said tip, a support for said heating element comprising a collar into which the terminals of said heating element extend to be clamped with current carrying leads therein, said collar being secured in position when said tip is secured to said stem, and clamping means engaging the flange on said tip for securing it to said stem.

3. An electric soldering iron comprising a supporting stem, a recessed tip equipped with a circular flange at one end for clamping it to said stem, an electrical heating element projecting into said tip, a support for said heating element comprising a collar into which the terminals of said heating element extend to be clamped with current carrying leads therein, said collar being secured in position when the flange on said tip is clamped to said stem, and a clamping nut at one end of said stem and equipped with a portion turned inwardly and downwardly to engage the flange on said tip for clamping it to said stem.

4. An electric soldering iron comprising a supporting stem, a recessed tip equipped with a circular outwardly projecting flange at one end for clamping it to said stem, an electrical heating element projecting into said tip, a support for said heating element comprising a collar positioned inside and below the flange on said tip and into which the terminals of said heating element extend to be clamped with current carrying leads therein, said collar being clamped in position when the flange on said tip is clamped to said stem, and clamping means engaging the flange on said tip and one end of said stem for clamping them together.

In witness whereof, we hereunto subscribe our names this 30th day of September, A. D 1920.

JAMES T. GRIFFIN.
WILLIAM A. TIMM.
ARTHUR E. SANTSCHI.